United States Patent [19]
Linnenkamp et al.

[11] Patent Number: 5,167,445
[45] Date of Patent: Dec. 1, 1992

[54] SIDE POSITIONED AQUARIUM ILLUMINATING DEVICE

[76] Inventors: Steven R. Linnenkamp, 19083 E. Mansfield Dr., Aurora, Colo. 80013-3657; Daren K. Daniels, 865 Kenton St., Aurora, Colo. 80010

[21] Appl. No.: 844,507

[22] Filed: Mar. 2, 1992

[51] Int. Cl.[5] ............................................. F12V 33/00
[52] U.S. Cl. .................................. 362/101; 362/253; 362/260; 362/396; 119/5
[58] Field of Search ............... 362/101, 125, 217, 216, 362/223, 253, 260, 396; 119/5

[56] References Cited

U.S. PATENT DOCUMENTS 3,696,789 10/1972 Richard .......................... 362/101 X
5,067,059 11/1991 Hwang ............................. 119/5 X

*Primary Examiner*—Stephen F. Husar

[57] ABSTRACT

A fluorescent illuminating device that mounts on a vertical side portion of an aquarium having a water resistant, rigid, vinyl housing with a vinyl woodgrain laminate 20 adhering to the back surface of the housing. The fixture can be mounted to any aquarium vertical side portion with a width of 12" or more. The fixture is mounted utilizing L-shaped securing hangers 12 that wedge between aquarium top frame element 10 and aquarium transparent surface 34. In addition, the securing hangers 12 wedge between channels 14A and rubber strips 14B positioned on the top surface of the housing. The L-shaped adhering braces 30A attach to the aquarium transparent surface 34 and attach to the bottom surface of the housing with screws 30C. This mounting configuration allows for the removal of the device by removing the screws 30C and pulling fixture out, perpendicular to aquarium transparent surface 34. The interior of the fixture has a reflecting surface 28C that primarily directs light diagonally into the aquarium. Illumination is provided by a single ended, twin tube, U-type lamp 24 positioned longitudinally on the reflector. The reflector and its mounted components are supported by nylon spacers 26 positioned between the reflector stabilizing surface 28B and the housing. A closed cell foam rubber seal 32 is bonded to the top and side edges of the housing. This rubber seal 32 protects the interior of the fixture from moisture when the fixture is mounted on aquarium transparent surface 34.

17 Claims, 2 Drawing Sheets

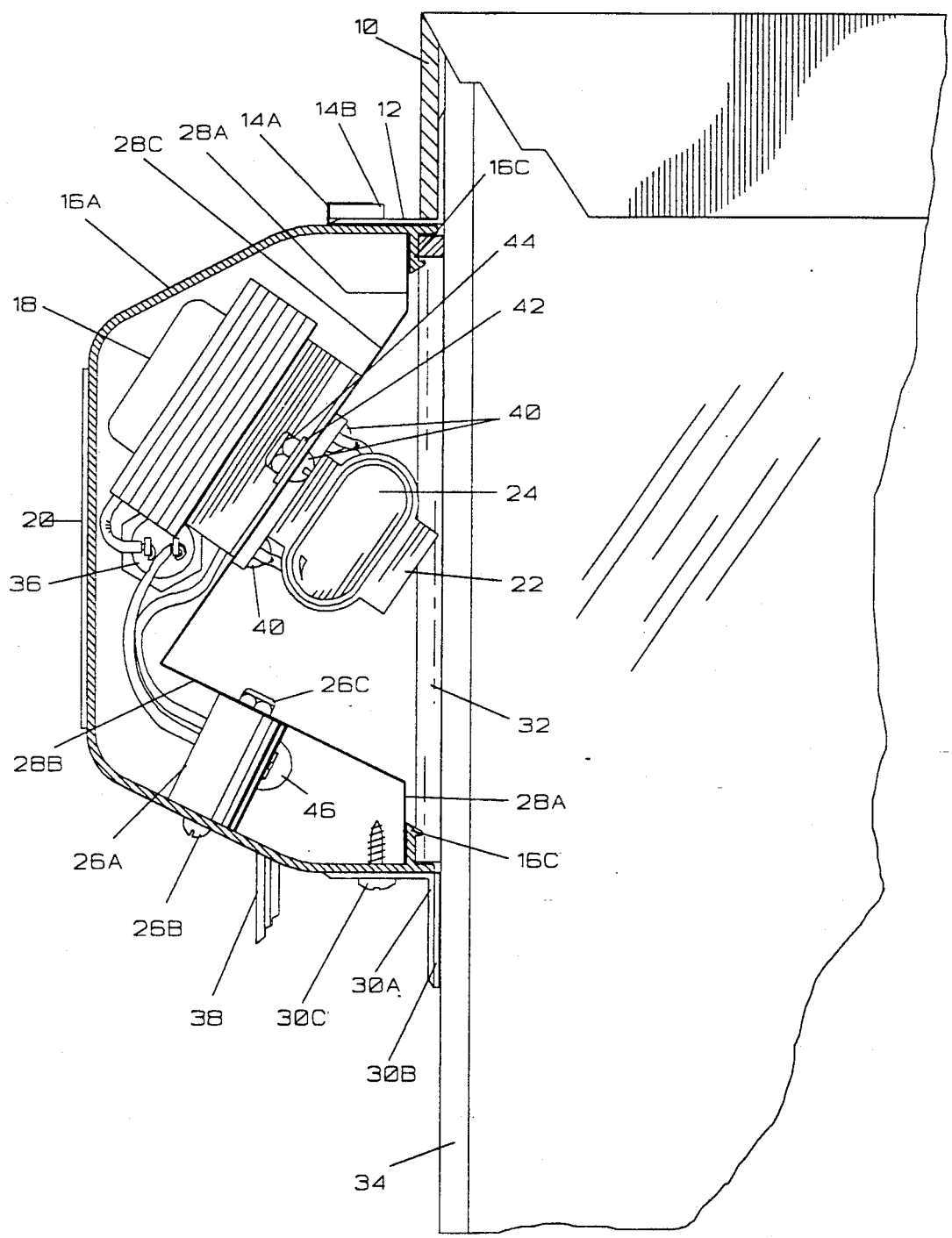

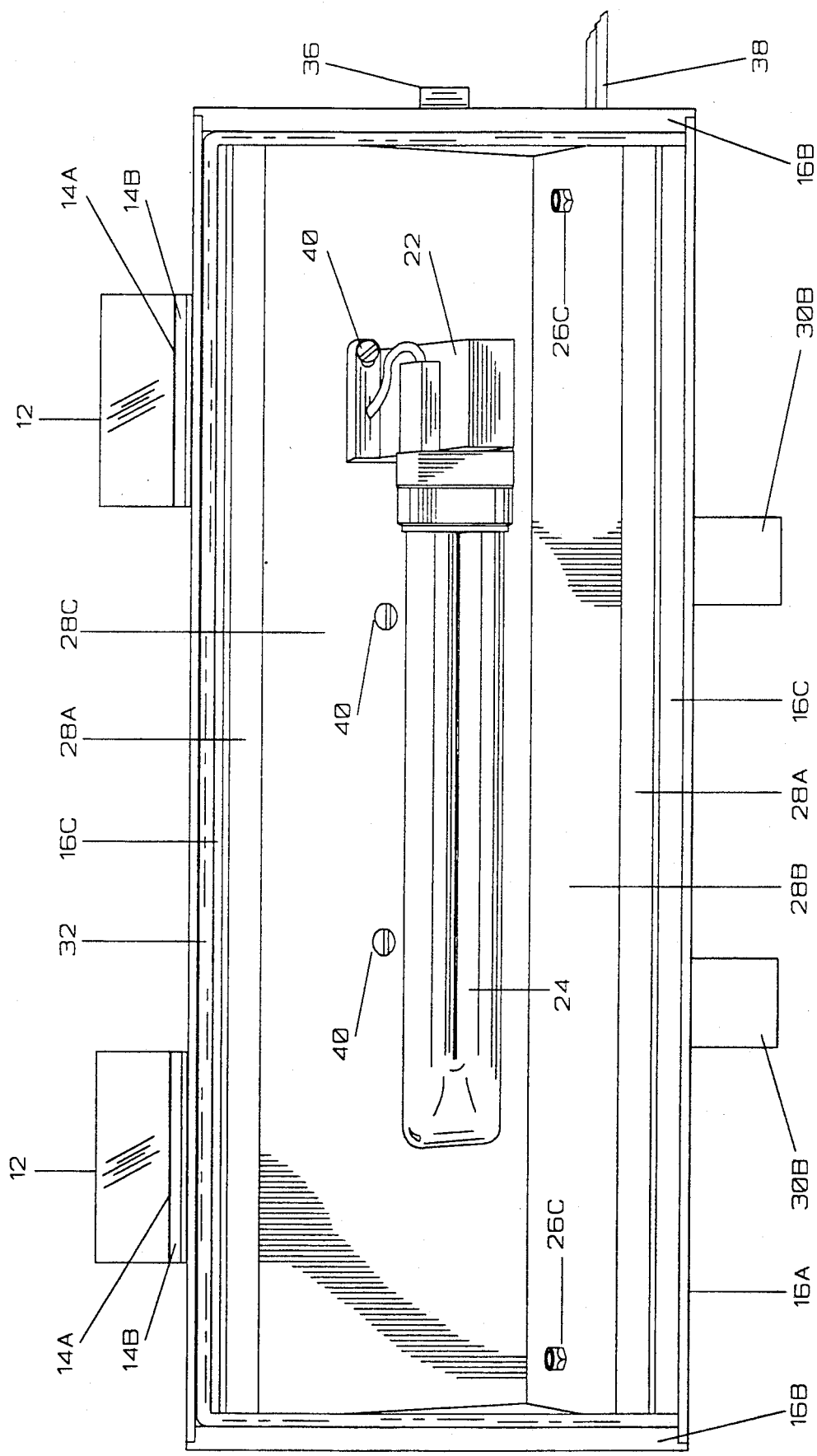

SIDE POSITIONED AQUARIUM ILLUMINATING DEVICE

BACKGROUND—FIELD OF THE INVENTION

This invention relates to an illumination device, specifically a device which illuminates aquaria such as are found in homes as well as public buildings and the like.

BACKGROUND—DISCUSSION OF PRIOR ART

Heretofore, aquarium illumination devices were positioned on the top of the aquaria. This position of the device has been the most commonly used method for illuminating aquaria. A light fixture positioned on the top provides illuminated viewing of the inhabitants. Also, adequate top illumination enables aquatic plants and light dependent organisms to undergo photosynthesis in both marine and fresh water aquaria. Several aquarium illuminating devices have been proposed, for example; U.S. Pat. No. 3,622,777 to Bovio (1969), U.S. Pat. No. 3,834,351 to Schmidt (1971), U.S. Pat. No. 3,841,267 to Miller (1971). These proposals have been of an above the tank design which suffer from a number of shortcomings:

(a) In a natural aquatic habitat, different positions of the sun create various patterns of light and shadow. Top illumination is often lacking in this natural effect.

(b) Lateral coloration of tropical fish and certain other aquatic animals is limited when exposed to top lighting only.

(c) One of the key elements of a healthy, aquatic life cycle is the amount and intensity of illumination, especially in marine aquaria. To attain the correct level of illumination, additional fixtures are often required. These fixtures take up valuable top space restricting access to the interior of the aquaria. To gain access, for purposes of feeding and cleaning, the top light fixtures need to be moved. This routine movement is an inconvenience to the aquarist.

(d) To sustain a healthy aquarium, comprehensive maintenance is required on a regular basis. This procedure involves the removal of all top components. When top components are removed, a lack of illumination makes effective cleaning difficult.

(e) Aquaria in present use, are commonly fitted with a plastic cover incorporating a lighting fixture. This design eliminates the possibility of providing supplemental top illumination. Hence, upgrading to adequate lighting proves costly because the previous design becomes useless when replaced (f) The general position of top lighting often subjects electrical components to the corrosive effects of evaporation and spray caused by the water cycling apparatus.

(g) Top lighting fixtures are manufactured in various dimensions to match specific tank sizes, thus compatibility is limited to a narrow range of tank sizes.

(h) Top illumination only limits the aquarist to a mono directional lighting configuration.

OBJECTS AND ADVANTAGES

Thus, several objects and advantages of our invention are:

(a) to provide patterns of light and shadow in the aquaria, similar to that which are found in a natural aquatic habitat.

(b) to provide effective lateral illumination for displaying the brilliant colors found in the tropical aquarium.

(c) to provide additional illumination without restricting access to the interior of the aquarium.

(d) to provide convenient illumination during comprehensive maintenance when top illumination is removed.

(e) to provide supplemental illumination when existing top design does not allow for it.

(f) to provide an illuminating fixture absent of the corrosive effects of evaporation and spray caused by the water cycling apparatus.

(g) to provide an illuminating fixture compatible with a wide range of tank sizes.

(h) to provide a plurality of lighting combination and directions to choose from when used in conjunction with existing top lighting.

Further objects and advantages of our invention will become apparent from a consideration of the drawings and ensuing description of it.

DRAWING FIGURES

FIG. 1 shows a full scale cross sectional side view of the fixture revealing the interior of the device and positions of the securing hangers and adhering braces.

FIG. 2 shows a ⅜ scale unmounted front view of the fixture.

REFERENCE NUMERALS IN DRAWINGS

10 Aquarium top frame element
12 1/16"×⅜"×⅜"×2" L-shaped securing hangers
14A 1/32"×¼"×¼"×2" polyvinylchloride channels
14B ⅛"×¼×2" rubber strips
16A 11 ¾" extruded polyvinylchloride length component
16B ¼" expanded polyvinylchloride end components
16C Retaining rails
18 120 volt, 60 Hz, 0.36 amp type 1 ballast
20 Vinyl woodgrain laminate
22 GX23 side mount lamp socket
24 13 watt, 5000 kelvin, fluorescent, single-ended, twin tube, U type lamp
26A 13/16" nylon spacers 5/32" I.D. ¼" O.D.
26B 4–40×1" round head machine screws
26C 4–40 locknuts
28A Retaining surfaces
28B Stabilizing surface
28C Reflecting surface
30A 1/16"×⅜"×⅜"×⅜" L-shaped adhering braces
30B 1/16"×⅜"×⅜" pressure sensitive double stick tape
30C #6×⅜" pan head sheet metal screws
32 ¼"×¼"×20 ½" closed cell foam rubber seal
34 Aquarium transparent surface
36 Single pole/single throw 3 amp, 250 volt push on/push off switch
38 18 gauge, 2 conductor lamp cord
40 6–32×⅜" pan head machine screws
42 #6 flat washers
44 6–32 locknuts
46 Flat Y-strap strain relief

DESCRIPTION—FIGS. 1 AND 2

A specific embodiment of the present invention is illustrated in FIG. 1 (side view) and FIG. 2 (front view). The housing assembly consists of an 11 ¾" extruded polyvinylchloride length component 16A incorporating top and bottom retaining rails 16C and two ¼" thick expanded polyvinylchloride end components 16B. The end components 16B are routed to match the shape and countersink into the length component 16A. These elements are cemented together using an all purpose PVC cement. The fixture has overall dimensions approximately 12 ⅞" in length, 4 ¾" in height and 2 ½" in width. Adhering to the length component 16A is a vinyl woodgrain laminate 20. On the exterior of the light around the top and side edges is ⅛"×⅛"×20 ½" closed cell foam rubber seal 32.

A reflector of aluminum flashing with a length of 11 ⅞" and a thickness of 1/64" has three longitudinal bends which produce four surfaces as seen in FIG. 1. These surfaces are as follows:

A) Two retaining surfaces 28A each having a width of ⅝" and an angle of 90 degrees.

B) A stabilizing surface 28B having a width of 1 ⅞" and an angle of 25 degrees.

C) A reflecting surface 28C having a width of 3" and an angle of 57 degrees.

On the reflecting surface 28C is a 120 volt, 60 HZ, 0.36 amp type 1 ballast 18 which is mounted using two 6-32×⅜" pan head machine screws 40, 6-32 lock nuts 44 and #6 flat washers 42. These screws 40 insert through two appropriately spaced and centered ⅛" holes from front side of reflecting surface 28C, attaching ballast 18 to backside of reflecting surface 28C when threaded into locknuts 44.

Also, on the reflecting surface 28C is a GX23, side mount lamp socket 22 which mounts using two 6-32×⅜" screws 40 and lock nuts 44. These screws 40 insert through socket 22 and ⅛" holes on front side of reflecting surface 28C and thread into lock nuts 44 which attach socket 22 to front side of reflecting surface 28C. The fixture is designed to use a 13 watt, 5000 kelvin, fluorescent, single ended, twin tube, U-type lamp 24 that is centered longitudinally on front side of reflecting surface 28C, as seen in FIG. 2. The lamp 24 has a starter integrated into its base.

Inside the housing are two stabilizing nylon spacers 26A each having a length of 13/16", an outside diameter of ¼" and an inside diameter of 5/32". The nylon spacers 26A are positioned between the housing and the stabilizing surface 28B using 4-40×1" round head machine screws 26B and 4-40 lock nuts 26C. Screws 26B are inserted through ⅛" hole in bottom angle of length component 16A, holes in spacers 26A and ⅛" holes in stabilizing surface 28B, then thread into lock nuts 26C as seen in FIG. 1.

A single pole/single throw, 3 amp, 250 volt, push on/push off switch 36 is mounted through an end component 16B of housing. A 18 gauge 2 conductor lamp cord 38 attaches through end component 16B of housing using a flat Y-strap strain relief 46, as shown in FIG. 2.

At the bottom of the housing are two 1/16"×⅜"×⅜"×⅞" L-shaped adhering braces 30A with a 5/32" centered hole through one arm of each brace. There is 1/16"×⅜"×⅜" pressure sensitive, double stick tape 38B adhering to opposite arm of each adhering brace 30A. Two #6×⅜" pan head sheet metal screws 30C insert through holes in arms of adhering braces 30A, attaching adhering braces 30A to the bottom of housing, as seen in FIG. 1.

At the top housing are two 1/16"×⅜"×⅜"×2" L-shaped securing hangers 12 which insert into two hanger fasteners. These hanger fasteners each consist of a ¼"×⅜" by 2" rubber strip 14B that is cemented to one interior surface of each channel 14A, as seen in FIG. 2. The channels 14A are cemented to the top of the length component 16A, using PVC cement, as shown in FIG. 2.

OPERATION—FIGS. 1 AND 2

The manner of using side positioned aquarium lighting differs from aquarium lighting in present use. The main function of the device is to illuminate the aquaria from a side position.

The 11 ⅞" extruded polyvinylchloride length component 16A and two ¼" thick expanded polyvinylchloride end components 16B provide a durable, water resistant housing for all interior elements. On the length component 16A is a vinyl woodgrain laminate 20 that provides an attractive look to the outside of the fixture.

The interior of the fixture has a reflector with two retaining surfaces 28A, a stabilizing surface 28B and a reflecting surface 28C that accomplish several functions. The reflecting surface 28C directs light into the aquarium at a 57 degree angle (FIG. 1). Also, this surface is used to securely mount a 120 volt, 60 Hz, 0.36 amp, type 1 ballast 18 using two 6-32 ×⅜" pan head machine screws 40, two #6 flat washers 42 and two 6-32 lock nuts 44. A GX23 side mount lamp socket mounts on the reflecting surface 28C using 6-32 screws 40 and 6-32 locknuts 44. The stabilizing surface 28B works in conjunction with two 13/16" long 5/32"I.D. ¼" O.D. nylon spacers 26A, two 4-40×1" round head machine screws 26B and two 4-40 lock nuts 26C which attach the reflector to the housing (FIG. 1). The two retaining surfaces 28A provide added stability for the reflector when they communicate with the retaining rails 16C (FIG. 1). The reflector, as a whole, shields the ballast 18 and wiring from moisture or tampering. Also, the reflector acts as a heat sink for the ballast 18 reducing its operational temperature. On the reflecting surface 28C, the mounted socket 22 enables a 13 watt, 5000 kelvin, fluorescent, single ended, twin tube, U-type lamp 24 to be positioned longitudinally (FIG. 2). This lamp 24 provides lateral illumination for the aquarium.

Mounted through end component 16B is a single pole/single throw, 3 amp, 250 volt, push on/push off switch 36 that provides a convenient way to turn fixture on and off (FIGS. 1 and 2). A flat Y-strap strain relief 46 secures an 18 gauge, 2 conductor lamp cord 38 to the end component 16B and eliminates strain on electrical connections inside the housing. The fixture can be manufactured to accommodate either a left or right side of an aquarium by merely exchanging end components 16B so that the switch 36 and the cord 38 are always to the rear of the tank.

The fixture mounts to any vertical side portion of an aquarium having a width of 12" or more using 1/16"×⅜"×⅜"×2" L-shaped securing hangers 12 and 1/16"×⅜"×⅜"×⅞" L-shaped adhering braces 30A. The securing hangers 12 are fastened to the housing by a gripping action of two hanger fasteners, each consisting of a 1/32"×¼"×⅜"×2" polyvinylchloride channel 14A and a ¼"×¼"×2" rubber strip 14B (FIG. 1). This gripping occurs when securing hangers 12 are inserted into the channels 14A causing compression of the rubber strips 14B. The fixture is mounted to the aquarium by wedging the securing hangers 12 between the aquarium top frame element 10 and aquarium transparent surface 34 (FIG. 1). This wedging method prevents the fixture from tilting away from the aquarium.

The adhering braces 30A are attached to the housing using #6 ×⅜" pan head sheet metal screws 30C. These adhering braces 30A secure the fixture to the aquarium transparent surface 34 using 1/16"×¾"×¾" pressure sensitive double stick tape 30B (FIG. 1). This securing method prevents the fixture from dropping downward. This mounting configuration allows for the removal of the fixture by removing screws 30C from the adhering braces 30A and pulling fixture out, perpendicular to the aquarium transparent surface 34.

A ⅛"×174 "×20 ½" closed cell foam rubber seal 32 is attached to the top and side edges of the housing. This rubber seal 32 prevents moisture from entering the fixture and also prevents light from escaping through the top and sides of the fixture. As a precaution, the bottom edge of the housing is absent of the rubber seal 32 allowing the unlikely occurrence of water in the fixture to drain out. Also, this gap allows air to enter and circulate within the fixture, lowering its operational temperature.

CONCLUSION, RAMIFICATION AND SCOPE OF INVENTION

Thus the reader will see that the side positioned aquarium illuminating device of this invention provides unique and convenient supplemental lighting. Furthermore this side mounted design benefits the aquarist in that it creates patterns of light and shadow in the aquarium producing a more natural effect;

it provides lateral illumination which enhances the brilliant colors of tropical fish;

it provides illumination that does not restrict access to the interior of the tank;

it provides illumination during comprehensive maintenance, when top lighting is removed;

it provides supplemental illumination when existing top design does not allow for it;

it provides an illuminating device that is not subjected to the corrosive effects of evaporation;

it provides an illuminating fixture compatible with a wide range of tank sizes; and it provides multiple combinations of illumination.

Although the description above contains many specificities, these should not be construed as limiting the scope of the invention but as merely providing illustrations of the presently preferred embodiments of this invention. For example, the fixture can have a shelf incorporated into its design, providing a place for fish food and accessories. Colored lamps can be used with this fixture to give the aquarium an exotic appearance. Several fixtures can be mounted to the same side, one below the other, using double stick tape on one arm of the L-shaped securing hangers, providing even more illumination.

Accordingly, the scope of the invention should be determined not by the embodiments illustrated but by the appended claims and their legal equivalents.

We claim:

1. An aquarium illuminating device positioned on a vertical side portion of an aquarium comprising:
    a) a housing made of a water resistant material having a elongated length component and a pair of end components;
    b) a light means positioned in said housing, producing a lighting effect within said aquarium, and wherein said light means is primarily directed diagonally through a transparent surface of said vertical side portion of said aquarium, and wherein said light means provides substantial illumination to enhance the growth of light dependent organisms within said aquarium; and
    c) a mounting means for fastening said housing to said vertical side portion of said aquarium, and wherein said mounting means allows said housing to demount from said vertical side portion of said aquarium, whereby said aquarium illuminating device provides supplimental illumination without losing top access to the interior of said aquarium, and whereby said device provides illumination during comprehensive maintenance when top fixture is removed, and whereby said device enhances the brilliant lateral color of many tropical inhabitants.

2. The aquarium illuminating device of claim 1 wherein said housing is made of rigid vinyl.

3. The aquarium illuminating device of claim 1, further including a water resistant seal which repels water from the interior of said housing when said housing is mounted to said vertical side portion of said aquarium.

4. The aquarium illuminating device of claim 3 wherein said water resistant seal is positioned on the front of said housing allowing said water resistant seal to communicate with said transparent surface of said aquarium.

5. The aquarium illuminating device of claim 4 wherein said water resistant seal is composed of closed cell foam rubber.

6. The aquarium illuminating device of claim 1 wherein said mounting means includes securing hangers.

7. The aquarium illuminating device of claim 6 wherein said securing hangers are L-shaped and wherein one arm of each said securing hanger wedges between an aquarium top frame element and said transparent surface.

8. The aquarium illuminating device of claim 6 wherein said securing hangers are composed of plastic.

9. The aquarium illuminating device of claim 1 wherein said mounting means includes hanger fasteners positioned on said housing.

10. The aquarium illuminating device of claim 9 wherein said hanger fasteners contains means for gripping the projecting horizontal arms of said securing hangers.

11. The aquarium illuminating device of claim 9 wherein said hanger fasteners includes channels with interior rubber strips.

12. The aquarium illuminating device of claim 1 wherein said mounting means includes adhering braces.

13. The aquarium illuminating device of claim 12 wherein said adhering braces are L-shaped and attach to the bottom of said housing using screws.

14. The aquarium illuminating device of claim 13 wherein said adhering braces includes pressure sensitive double stick tape allowing said adhering braces to attach to said transparent surface.

15. The aquarium illuminating device of claim 13 wherein said adhering braces are composed of plastic.

16. The aquarium illuminating device of claim 1 wherein said light means includes a U-type fluorescent lamp.

17. The aquarium illuminating device of claim 1 wherein said light means includes a reflector.

* * * * *